(12) United States Patent
Pruett et al.

(10) Patent No.: US 7,671,801 B2
(45) Date of Patent: Mar. 2, 2010

(54) ARMOR FOR AN ELECTRONICALLY SCANNED ARRAY

(75) Inventors: James A. Pruett, Plano, TX (US);
Frank L. Shacklee, Whitesboro, TX (US)

(73) Assignee: Raytheon Company, Waltham, MA (US)

( * ) Notice: Subject to any disclaimer, the term of this patent is extended or adjusted under 35 U.S.C. 154(b) by 871 days.

(21) Appl. No.: 11/230,800

(22) Filed: Sep. 19, 2005

(65) Prior Publication Data

US 2008/0029480 A1 Feb. 7, 2008

(51) Int. Cl.
*G01S 3/78* (2006.01)
(52) U.S. Cl. .................. 342/463; 342/446; 89/36.01
(58) Field of Classification Search .............. 342/13, 342/463, 445, 446; 89/36.01, 36.04
See application file for complete search history.

(56) References Cited

U.S. PATENT DOCUMENTS

| | | | | |
|---|---|---|---|---|
| 3,648,113 A | * | 3/1972 | Rathjen et al. | 361/707 |
| 4,251,679 A | * | 2/1981 | Zwan | 136/244 |
| 4,783,666 A | | 11/1988 | Ast et al. | 343/872 |
| 4,998,181 A | * | 3/1991 | Haws et al. | 361/702 |
| 5,020,586 A | * | 6/1991 | Mansingh | 165/80.3 |
| 5,182,155 A | | 1/1993 | Roe | 428/116 |
| 5,412,414 A | | 5/1995 | Ast et al. | 342/174 |
| 6,292,364 B1 | * | 9/2001 | Fitzgerald et al. | 361/699 |
| 6,404,632 B1 | * | 6/2002 | Forkas | 361/703 |
| 6,952,345 B2 | * | 10/2005 | Weber et al. | 361/699 |

FOREIGN PATENT DOCUMENTS

EP   0 318 311 A2   11/1987

OTHER PUBLICATIONS

European Search Report, Feb. 15, 2007; application/patent No. 06254858.1-2220; reference No. JL35879P.EPP; applicant: Raytheon Co.; 9 pages, 2007.
"Capabilities and Design of the Cobra System;" XP-002418091; Euro-Art, GmbH, Germany; 28pp.
S.Y. Peng, et al.; "Kvelar Armored Phased-Array;" XP-002418092' IEEE; pp. 209-212, 1981.
J.L.B. Walker; "Antenna and Microwave Aspects of the Cobra Radar System;" Conference proceedings MM 92; Wed. 14th to 15th, Oct. 1992, Brighton Hotel, Brighton UK; XP 308208A; pp. 53-60, 1992.
J. Dayton Adams, et al.; "Armored Phased Array Design;" XP 000630019; publication date: Jun. 9, 1993; Georgia Institute of Technology, Atlanta, Georgia; pp. 872-874, 1993.

* cited by examiner

*Primary Examiner*—Stephen M Johnson
(74) *Attorney, Agent, or Firm*—Baker Botts L.L.P.

(57) ABSTRACT

According to an embodiment of the present invention, an electronically scanned array includes a plurality of armor segments interspersed between a plurality of transmit/receive integrated microwave modules (TRIMMs), and a clamping element compressing the armor segments.

12 Claims, 2 Drawing Sheets

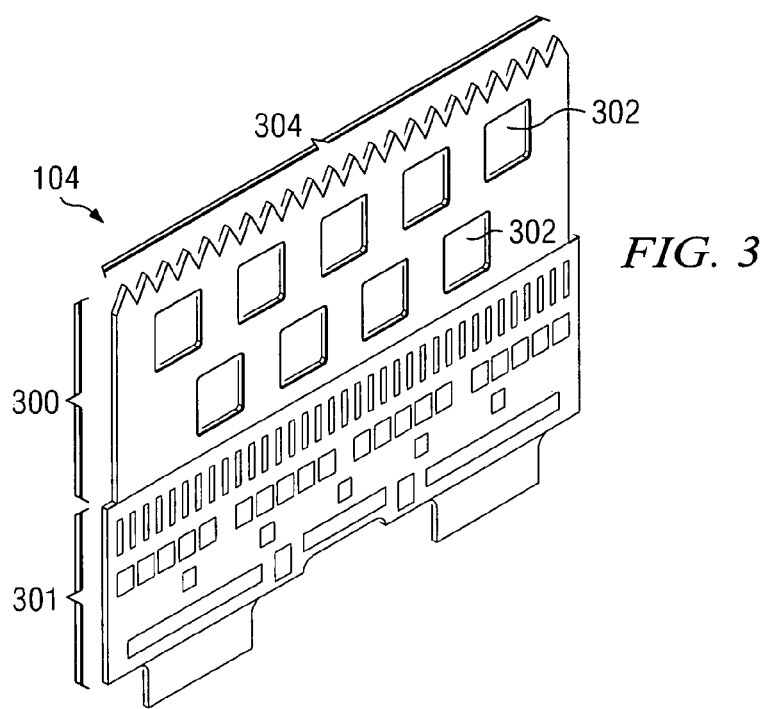
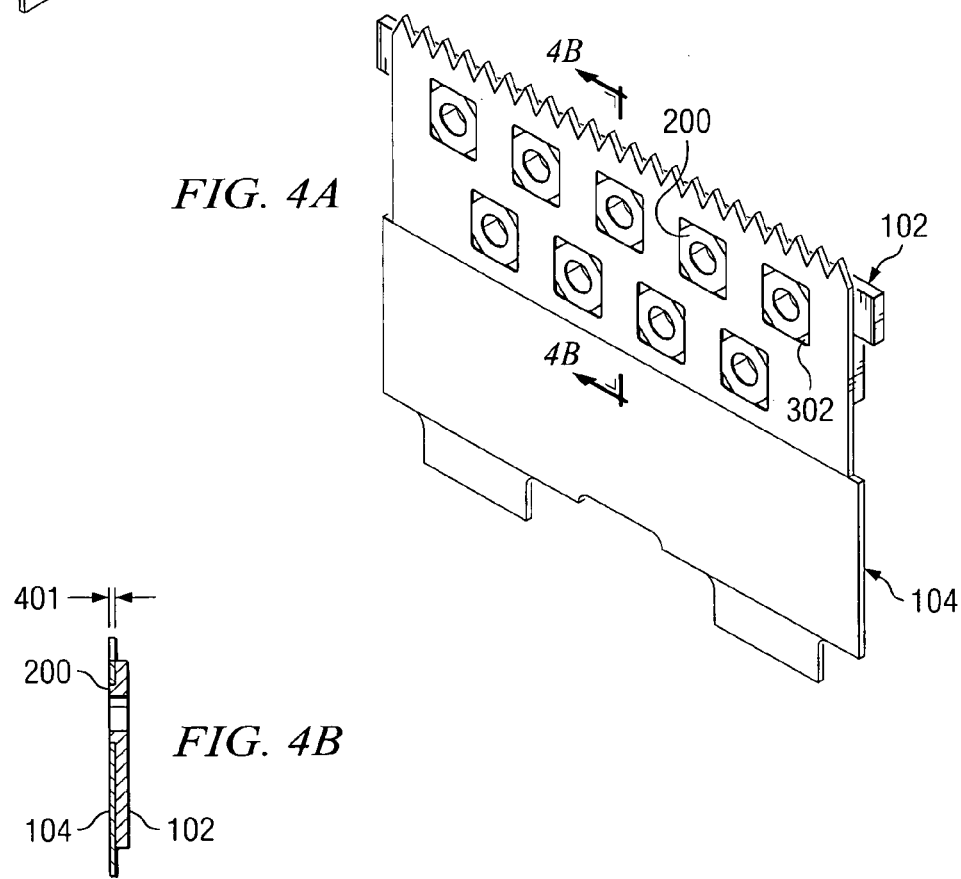

ARMOR FOR AN ELECTRONICALLY SCANNED ARRAY

GOVERNMENT FUNDING

This invention was made with Government support via Contract DAAE07-03-9-F001 awarded by the United States Army. The Government has certain rights in this invention.

TECHNICAL FIELD OF THE INVENTION

This invention relates in general to phased arrays and, more particularly, to armor for an electronically scanned array.

BACKGROUND OF THE INVENTION

During recent decades, antenna technology has experienced an increase in the use of antennas that utilize an array of antenna elements, one example of which is a phased array antenna, such as an active electronically scanned array. Antennas of this type have many applications in commercial and defense markets, such as communications and radar systems. In many of these applications, especially for radar systems used on ships and land-based vehicles, protection from bullets and other projectiles is important to avoid disablement of the antenna.

SUMMARY OF THE INVENTION

According to an embodiment of the present invention, an electronically scanned array includes a plurality of armor segments interspersed between a plurality of transmit/receive integrated microwave modules (TRIMMs), and a clamping element compressing the armor segments.

Embodiments of the invention provide a number of technical advantages. Embodiments of the invention may include all, some, or none of these advantages. For example, in one embodiment, an armor for a electronically scanned array ("ESA") protects the electronics of the ESA when impacted by a projectile so that the ESA remains functional. Such an armor facilitates a smaller footprint than a radome, which are not as effective in stopping bullets from impacting and disabling an ESA. The armor also has no effect on the radiating beam.

Other technical advantages are readily apparent to one skilled in the art from the following figures, descriptions, and claims.

BRIEF DESCRIPTION OF THE DRAWINGS

FIG. 3 is a perspective view of a TRIMM according to one embodiment of the present invention; and FIG. 4A is a perspective view, and FIG. 4B is a cross-section, of a TRIMM and an armor segment coupled together according to one embodiment of the present invention.

DETAILED DESCRIPTION OF THE INVENTION

Embodiments of the present invention and some of their advantages are best understood by referring to FIGS. 1 through 4B of the drawings, like numerals being used for like and corresponding parts of the various drawings.

Figure 1:
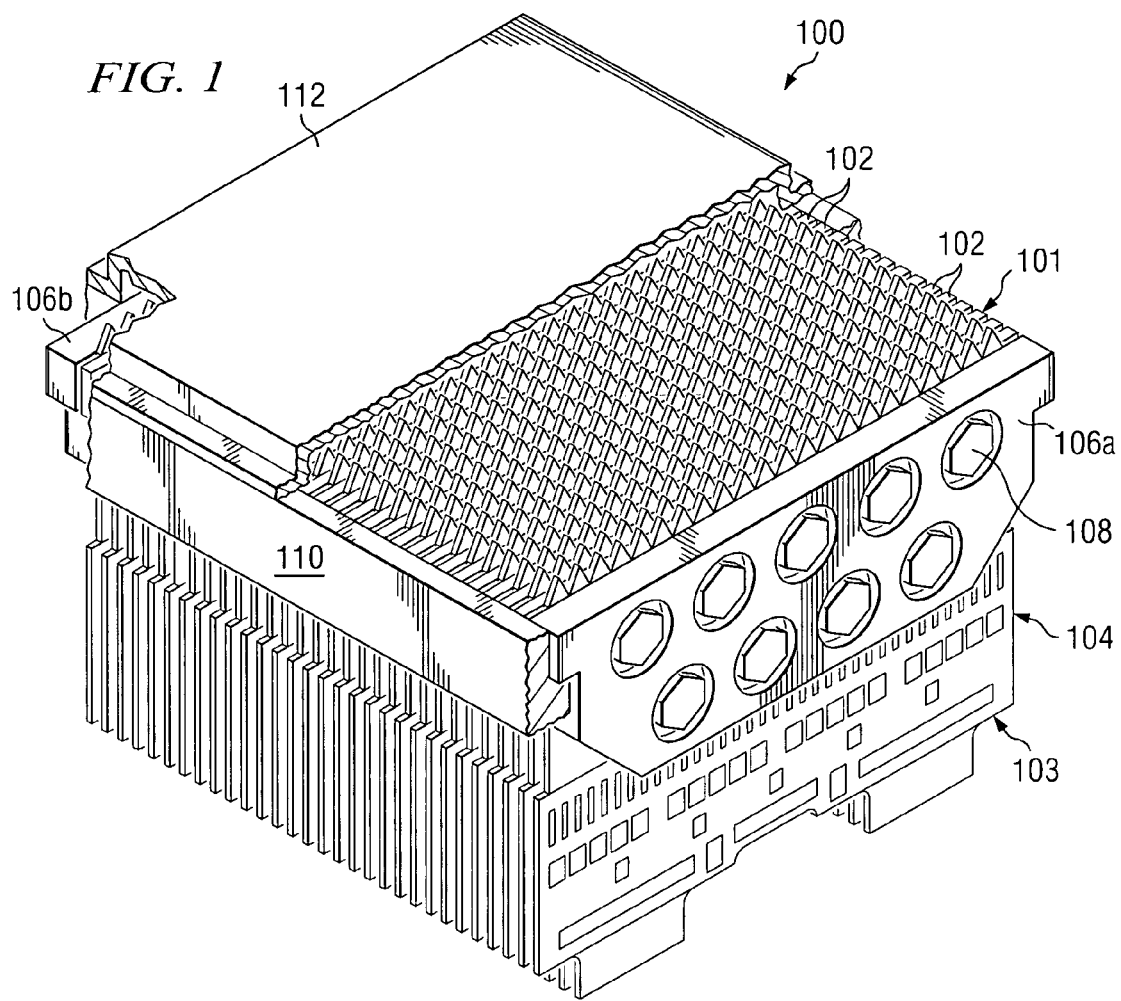
FIG. 1 is a perspective view of an armored electronically scanned array according to one embodiment of the present invention.

FIG. 1 is a perspective view of an armored electronically scanned array ("ESA") according to one embodiment of the invention. Armored ESA 100 may be used in any suitable application, such as phased array radars used on ships, land based vehicles, and aircraft. Generally, an armor 101 is utilized to protect the electronics of an ESA 103 when impacted by a projectile so that the ESA 103 may remain functional. Any suitable ESA 103 is contemplated by the present invention, such as an active ESA or a passive ESA.

In the illustrated embodiment, armor 101 includes a plurality of armor segments 102 interspersed between a plurality of transmit/receive integrated microwave modules ("TRIMMs") 104 associated with ESA 103. Armor segments 102 may be held together by a suitable clamping element, such as a clamp 110 surrounding a perimeter of armor segments 102 or a plurality of bolts 108 and respective nuts (not illustrated) disposed through armor segments 102. Any suitable compression force generated by such clamping element is contemplated by the present invention.

Also illustrated in FIG. 1 is an optional radome 112 coupled to armor segments 102. Any suitable radome is contemplated by the present invention for use with armored ESA 100, such as an environmental radome that has any suitable size and shape and is formed from any suitable material. Radome 112 may be coupled to armor segments 102 or other portions of armored ESA 100 using any suitable coupling method.

Armor segments 102 may be interspersed between TRIMMs 104 at any suitable interval; however, in a preferred embodiment, armor segments 102 and TRIMMs 104 are aligned in an alternating fashion. For example, the progression of elements may be an optional end plate 106a then one of the TRIMMs 104, then one of the armor segments 102, and so on, until the last TRIMM 104 is reached Then an end plate 106b completes the succession. A clamping force is then be applied to end plates 106a, 106b to hold armor segments 102 in compression. As described above, this may be accomplished by a plurality of bolt 108/nut combinations disposed through each of the armor segments 102 or by a suitable clamp 110. Other clamping methods are contemplated by the present invention, such as welding the armor segments 102 together.

Figure 2:
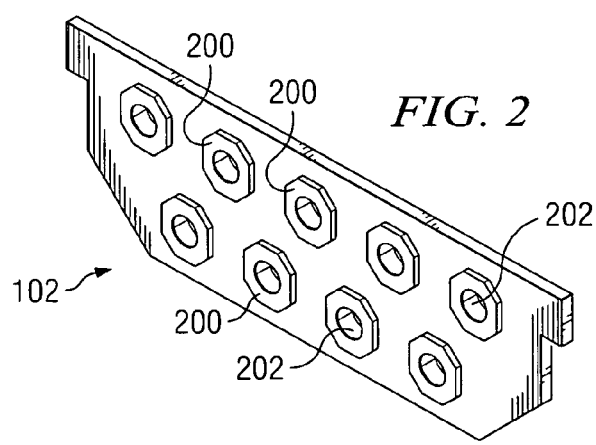
FIG. 2 is a perspective view of an armor segment according to one embodiment of the present invention.

FIG. 2 is a perspective view of an armor segment 102 according to one embodiment of the invention. Armor segments 102 may have any suitable size and shape, and may be formed from any suitable material, such as a suitable metal, a composite material, a plastic, a ceramic, or other suitable materials.

In the illustrated embodiment, armor segment 102 includes a plurality of bosses 200 surrounding respective apertures 202. Bosses 200 may have any suitable size and shape. However, in one embodiment, bosses 200 have a thickness that is equal to a thickness of a radiator structure 300 (FIG. 3) associated with TRIMM 104. The reason for this is discussed in greater detail below in conjunction with FIGS. 4A and 4B. In addition, the shape of the perimeter of bosses 200 may be any suitable shape; however, in one embodiment, the perimeter is shaped to match up with the shape of apertures 302 (FIG. 3) that are formed in radiator structure 300.

FIG. 3 is a perspective view of a TRIMM 104 according to one embodiment of the present invention. TRIMM 100, which may also be referred to as a slat or sub array, is a segment of ESA 103 that includes a radiator structure 300 and an electronics portion 301.

Radiator structure 300 includes a plurality of radiating elements 304, such as wideband notch radiators. In addition, in one embodiment, apertures 302 are formed in radiator structure 300 to allow bolts 108 to extend therethrough when used for clamping armor segments 102 together. In some embodiments of the invention, apertures 302 may not exist. If utilized, apertures 302 may have any suitable size and shape and may be arranged in any suitable orientation. In one particular embodiment of the invention, apertures 302 are aligned in two rows and are arranged in a staggered manner. In order to allow radiating elements 304 to perform their function, radiator structure 300 has a greater depth than prior radiator structures associated with prior TRIMMs.

Electronics portion 301 is that portion of ESA 103 that is meant to be protected by armor 101 when struck by a projectile. Electronics portion 301 includes some of the electronics associated with ESA 103, such as transmit/receive modules and feed networks. For example, transmit/receive modules may be monolithic microwave integrated circuits ("MMICs").

FIG. 4A is a perspective view and FIG. 4B is a cross-sectional view of a TRIMM 104 and an armor segment 102 coupled together according to one embodiment of the invention. FIGS. 4A and 4B illustrate in more detail the interaction between an armor segment 102 and a TRIMM 104 when engaged.

As illustrated in FIG. 4A, bosses 200 of armor segment 102 fit within apertures 302 of TRIMM 104. As illustrated in FIG. 4B, the thickness of bosses 200 are the same thickness as a thickness 401 of TRIMM 104. This allows contiguous armor segments 102 to engage one another without applying any sort of crush force on TRIMM 104, which is usually made of a material that can be easily damaged. Therefore, bosses 200 protect TRIMMs 104 from becoming damaged or inoperable due to a compressive force applied to armor segments 102 by a suitable clamping element. In some embodiments, bosses 200 are not utilized with armor segments 102, such as when TRIMMs 104 are made from a material that will not distort, crush or otherwise be damaged by a compressive force.

Thus, armor 101 protects electronics portion 301 of TRIMMs 104 when impacted by a projectile, such as a bullet, so that ESA 103 remains functional. An advantage of the present invention is that, as armored ESA 100 is repeatedly struck by projectiles, there is a graceful degradation of the functionality of armored ESA 100. The use of armor 101 also facilitates a smaller footprint than a ballistic-type radome, which is not as effective in stopping bullets or other projectiles from impacting and disabling an ESA. Armor 101, according to the teachings of the present invention, also has no effect on the radiating beam generated by ESA 103.

Although embodiments of the invention and some of their advantages are described in detail, a person skilled in the art could make various alterations, additions, and omissions without departing from the spirit and scope of the present invention as defined by the appended claims.

What is claimed is:

1. An electronically scanned array, comprising:
a plurality of transmit/receive integrated microwave modules (TRIMMs), each TRIMM comprising a radiator portion on one end and a separate electronics portion on the opposite end of the TRIMM from the radiator portion, the electronic portions comprising electronic devices, the radiator portions comprising radiating elements operable to radiate electronic signals produced by the electronic devices into free space; and
a plurality of armor segments interspersed between the radiator portions of the plurality of TRIMMs, the plurality of armor segments and the radiator portions of the plurality of TRIMMs being interspersed in an alternating arrangement held in compression by a clamping force; at least a portion of the radiating elements of the radiator portions of the plurality of TRIMMs remaining uncovered by the armor segments;
wherein the alternating arrangement of the plurality of armor segments and the radiator portions of the plurality of TRIMMs are operable to protect the electronic portions of the plurality of TRIMMs from a projectile fired at the electronic portions from the direction of the radiator portions.

2. The electronically scanned array of claim 1, further comprising a pair of end plates disposed on either end of the armor segments.

3. The electronically scanned array of claim 1, wherein the armor segments are formed from a material selected from the group consisting of a metal, a composite material, a plastic, and a ceramic.

4. The electronically scanned array of claim 1, further comprising a plurality of radiator structures associated with respective TRIMMs, each radiator structure including a plurality of apertures formed therein.

5. The electronically scanned array of claim 4, further comprising a plurality of bosses associated with each armor segment, the plurality of bosses in alignment with respective apertures in the radiator structures.

6. The electronically scanned array of claim 1, further comprising a radome coupled to the armor segments and covering a plurality of radiator structures associated with respective TRIMMs.

7. The electronically scanned array of claim 1, further comprising a clamping element compressing the armor segments.

8. The electronically scanned array of claim 7, wherein the clamping element comprises a clamp surrounding a perimeter of the armor segments.

9. An electronically scanned array, comprising:
a plurality of transmit/receive integrated microwave modules (TRIMMS) each comprising a radiator portion on one end and a separate electronics portion on the opposite end of the TRIMM from the radiator portion, the electronic portions comprising electronic devices, the radiator portions comprising radiating elements operable to radiate electronic signals produced by the electronic devices into free space;
each radiator portion comprising radiating elements and a plurality of apertures formed therein;
a plurality of armor segments interspersed between the radiator portions of the TRIMMs in an alternating arrangement, the plurality of armor segments and the radiator portions operable to protect the electronics portion of each TRIMM from a projectile fired at the electronic portion from the direction of the radiator portion;
a plurality of bosses associated with each armor segment, the plurality of bosses in alignment with respective apertures in the radiator portions; and
a pair of end plates disposed on either end of the armor segments.

10. The electronically scanned array of claim 9, wherein the armor segments are formed from a material selected from the group consisting of a metal, a composite material, a plastic, and a ceramic.

11. The electronically scanned array of claim 9, further comprising a radome coupled to the armor segments and covering the radiator portions.

12. The electronically scanned array of claim 9, wherein the plurality of apertures are aligned in at least two rows.

* * * * *